Jan. 14, 1969   R. L. BELLEM   3,422,241
WHEEL CONSTRUCTION FOR A BRUSHLESS WIRE PREHEATER
Filed May 3, 1966

INVENTOR
ROBERT L. BELLEM
BY
Max Schwartz
ATTORNEY

United States Patent Office 3,422,241
Patented Jan. 14, 1969

3,422,241
WHEEL CONSTRUCTION FOR A BRUSHLESS WIRE PREHEATER
Robert L. Bellem, Scituate, R.I., assignor to Walco Electric Company, Providence, R.I., a corporation of Rhode Island
Filed May 3, 1966, Ser. No. 547,206
U.S. Cl. 219—10.61                                7 Claims
Int. Cl. H05b 5/00; 9/06

ABSTRACT OF THE DISCLOSURE

A composite wheel for running a plurality of wires through a brushless wire preheater. A pair of wheels are mounted on an idler shaft, one wheel keyed to the shaft and the other wheel on a separate bearing in the shaft for relative rotation with the first wheel. Each wheel has a pair of grooves for handling a single wire. The relative rotation compensates for any uneven wear of the grooves.

---

My present invention relates to wire preheaters and more particularly to a novel wheel construction for a brushless wire preheater.

The principal object of the present invention is to provide a wheel construction for handling a pair of wires simultaneously in a brushless wire preheater.

A further object of the present invention is to provide a wheel construction for a brushless wire preheater which compensates for uneven wear of the wheel.

A further object of the present invention is to provide a wheel construction which permits the ready handling of a pair of wires in different wheel grooves and which compensates for the uneven depth of the grooves.

A further object of the present invention is to provide a double wheel construction which is simple and easy to manufacture and assemble.

With the above and other objects and advantageous features in view, my invention consists of a novel arrangement of parts, more fully disclosed in the detailed description following, in conjunction with the accompanying drawings, and more particularly defined in the appended claims.

The present invention constitutes an improvement on the type of wire preheater shown in U.S. Patent No. 3,117,209 issued Jan. 7, 1964 to Wilfred L. Peltier and entitled Brushless Wire Preheater. This patent illustrates a construction in which a wire can be electrically heated by passing it through an inductor. To speed production, the brushless wire preheaters illustrated therein have been modified to handle two wires simultaneously. In the patent, the wire enters the preheater from one side, passes over a top wheel through the primary windings of the inductor down the bottom wheel and then back over the top wheel again and then out of the device. This required that the bottom wheel have one groove and the top wheel have a double groove. When two wires were being handled simultaneously, they merely increased the width of the top wheel to make four grooves therein and then increased the width of the bottom wheel and put two grooves therein. However, in practice, it was found that the grooves have a tendency to wear unevenly, and whereas one wire would be fairly straight and under tension as it passed through the machine the other wire would sag and bulge at the sides of the loop. The present invention is designed to provide a wheel construction which allows for uneven wear in the grooves, so that both wires would pass evenly through the device.

Figure 1:
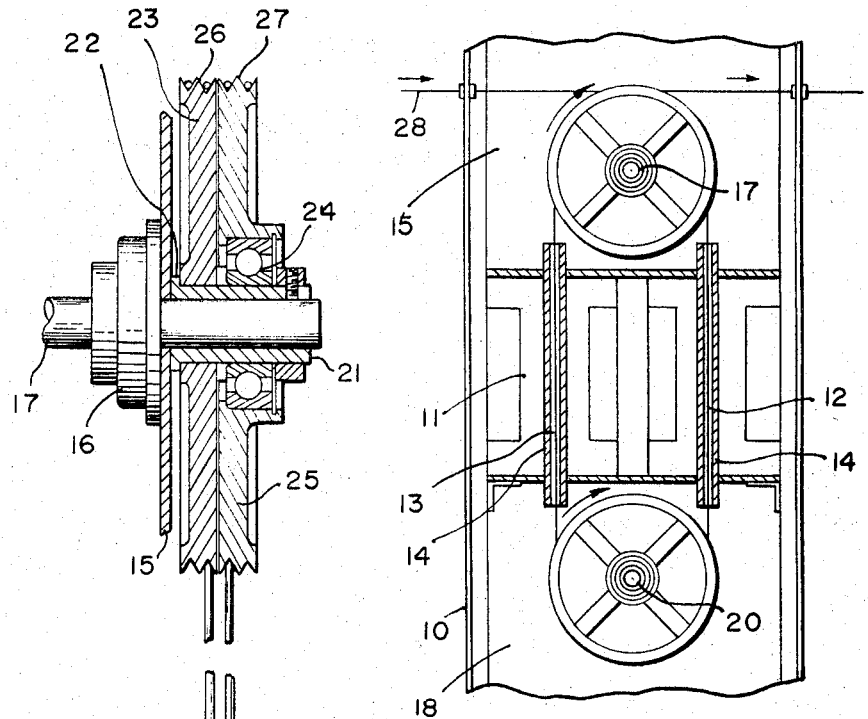
FIG. 1 is a front elevation, partly in section, of a brushless wire preheater embodying my present invention.

Referring more in detail to the drawings, FIG. 1 illustrates the general operation of the preheater. It comprises a housing 10 in which the inductor 11 is supported intermediate the upper and lower ends. The inductor 11 comprises iron cores with windings therearound. Two vertical passageways 12 and 13 are provided to allow the wire to pass through the inductor, and both passageways are lined with liners 14 of fiberglass or similar insulating material to prevent damage to the windings from the heat of the wire. The housing 10 is provided with an upper front wall portion 15 carrying bearings 16 in the rear thereof and supporting the shaft 17 on which the upper wheel assembly is mounted. In vertical alignment therewith and below the inductor 11 is another front wall portion 18 having bearings 19 in the rear thereof and supporting the horizontal shaft 20 on which the bottom wheel is mounted. In accordance with the construction and operation described in the patent hereinabove referred to, movement of the wire over the upper wheel down through the inductor around the lower wheel and then up through the inductor and over the upper wheel assembly again and out of the device causes rotation of the upper and lower wheel assembly. The lower shaft 20 may thus be provided with an inertia switch or any other device. The upper shaft 17 is merely mounted for free rotation.

Figure 2:
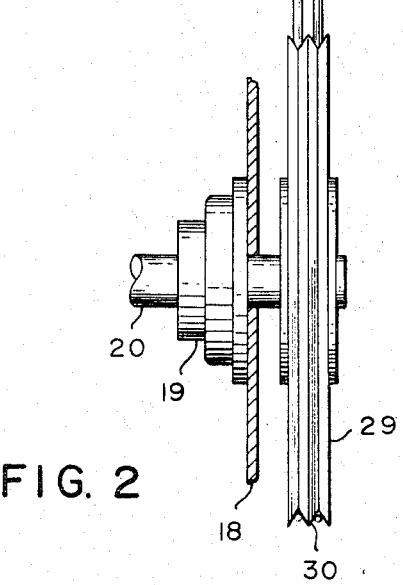
FIG. 2 is an enlarged vertical section showing the upper and lower wheel constructions.

Now viewing FIG. 2, I provide the outer end of the shaft 17 with a bushing 21 mounted on to the shaft and provided at its inner end with a flange 22. I now provide an inner grooved wheel 23 pressed on to the bushing 21 and rotatable therewith. The grooved wheel 23 and its bushing 22 and the shaft 17 will thus rotate together. In front of the wheel 23, and mounted on the bushing 21 is a ball bearing assembly 24 supporting a second grooved wheel 25 slightly spaced from the grooved wheel 23. The wheel 23 is provided with a pair of grooves 26 and the wheel 25 is provided with a pair of grooves 27. The wheels 23 and 25 are preferably made of Phosphor bronze.

With the construction illustrated in FIG. 2 and hereinabove described, it is obvious that the wheel 25 can rotate on the ball bearings 24 independently of the rotation of the wheel 23, bushing 22 and shaft 17. This provides for a differential in the speed of rotation of the two wheels. Now as illustrated in FIG. 1, the wires 28 enter from the left of the housing 10 and pass through the wall of the housing horizontally until they contact the wheels 25 and 23. One wire passes through one of the grooves 26 and the other wire passes through one of the grooves 27. The wire is then passed downwardly through the vertical opening 12 around the bottom wheel and up through the vertical opening 13 and into the second set of grooves 26 and 27 and out to the left of the housing as shown in FIG. 1. The movement of the wire causes rotation of the various wheels. However, since the wire is heated to a considerable degree and moving quite rapidly wear develops within the groove. Since there is no way of controlling the rate of wear in each wheel, it will soon be found that the grooves in one wheel are slightly deeper than the grooves in the other wheel. However, all that will happen is that one wheel will rotate at a different rate of speed than the other wheel and the wires themselves will maintain their proper tension and position in passing through the device. The construction illustrated in FIG. 2, which permits relative motion between the wheels 23 and 25 thus compensates for the uneven wear of the grooves.

While the construction illustrated in the upper wheels can also be duplicated at the bottom, I prefer to use the wheel assembly illustrated therein. As shown in FIG. 2 the bottom wheel 29 is a single wheel having a pair of grooves 30 and locked to the shaft 20 in the conventional manner. The bottom wheel can be made of aluminum, Phosphor bronze, or cast iron. However, it is preferred that the surface of the bottom wheel be sprayed with a coating of aluminum oxide to a depth of approximately .005 to .008 inch. The sprayed coating is then ground and polished. This provides for an extremely hard surface which resists the wear and also produces an extremely smooth surface which allows for relative slippage of the wire in passing around the wheel 29. This slippage plus the relative motion between the two upper wheels retains the wires in straight position as illustrated in FIG. 1. There is no gapping or bulging at the loops as it passes through the inductor and there is no slack to be taken up. The device thus allows for any slack or slippage due to the wear of the grooves.

Where a single wire is passed through the preheater no problems arise. However, where increased production is required and a multiplicity of wires are passed through, the construction illustrated in the present invention allows the wires to pass through as though independently moving. The split upper wheel construction lets each wire to seek its own level within the depths of the grooves without disturbing the motion of the adjacent wire. The device is fairly simple in construction and easy and economical to manufacture and assemble. Other advantages of the present invention will be readily apparent to a person skilled in the art.

I claim:
1. In a brushless wire preheater having a housing, an inductor mounted in said housing, an upper grooved wheel above the inductor and a lower grooved wheel below the inductor, wherein a plurality of wires enters the housing from one side, passes over the upper grooved wheel, downwardly through the inductor, around the lower grooved wheel, upwardly through the inductor, over the upper grooved wheel again, and out of the other side of the housing, an upper grooved wheel assembly comprising an idler shaft rotatably mounted on said housing, and a pair of spaced grooved wheels mounted on said shaft, one of said wheels being mounted for rotation with said shaft and the other of said wheels being freely rotatable to permit relative rotation of said wheels, each of said wheels having a pair of spaced, parallel, peripheral grooves.

2. In a brushless wire preheater as in claim 1, wherein a bushing is mounted on said shaft to rotate therewith, said wheels being mounted on said bushing, one of said wheels being frictionally mounted to rotate with said bushing and shaft.

3. In a brushless wire preheater as in claim 2, wherein a ball bearing is mounted on said bushing, and said freely rotatable wheel is mounted on said ball bearing.

4. In a brushless wire preheater as in claim 1, wherein there is a lower grooved wheel assembly identical with said upper grooved wheel assembly.

5. In a brushless wire preheater as in claim 1, wherein there is a lower grooved wheel assembly comprising a shaft and a wheel mounted on and rotatable with said shaft, said wheel having a pair of spaced, parallel, peripheral grooves.

6. In a brushless wire preheater as in claim 5, wherein said lower wheel is provided with a highly polished aluminum oxide surface.

7. In a brushless wire preheater as in claim 1, wherein there is a lower grooved wheel assembly comprising a shaft, and a wheel mounted on and rotatable with said shaft, said wheel having a pair of spaced, parallel, peripheral grooves, said wheel having a highly polished aluminum oxide surface.

References Cited
UNITED STATES PATENTS

| 3,117,209 | 1/1964 | Peltier | 219—10.61 |
| 3,176,111 | 3/1965 | Peltier | 219—10.61 |
| 3,328,554 | 6/1967 | Biskeborn | 219—10.67 |

RICHARD M. WOOD, *Primary Examiner.*

L. H. BENDER, *Assistant Examiner.*

U.S. Cl. X.R.
242—47.08